Jan. 29, 1935.   W. A. MARTIN   1,989,521
ATTACHMENT FOR PLOWS AND THE LIKE
Filed June 12, 1933
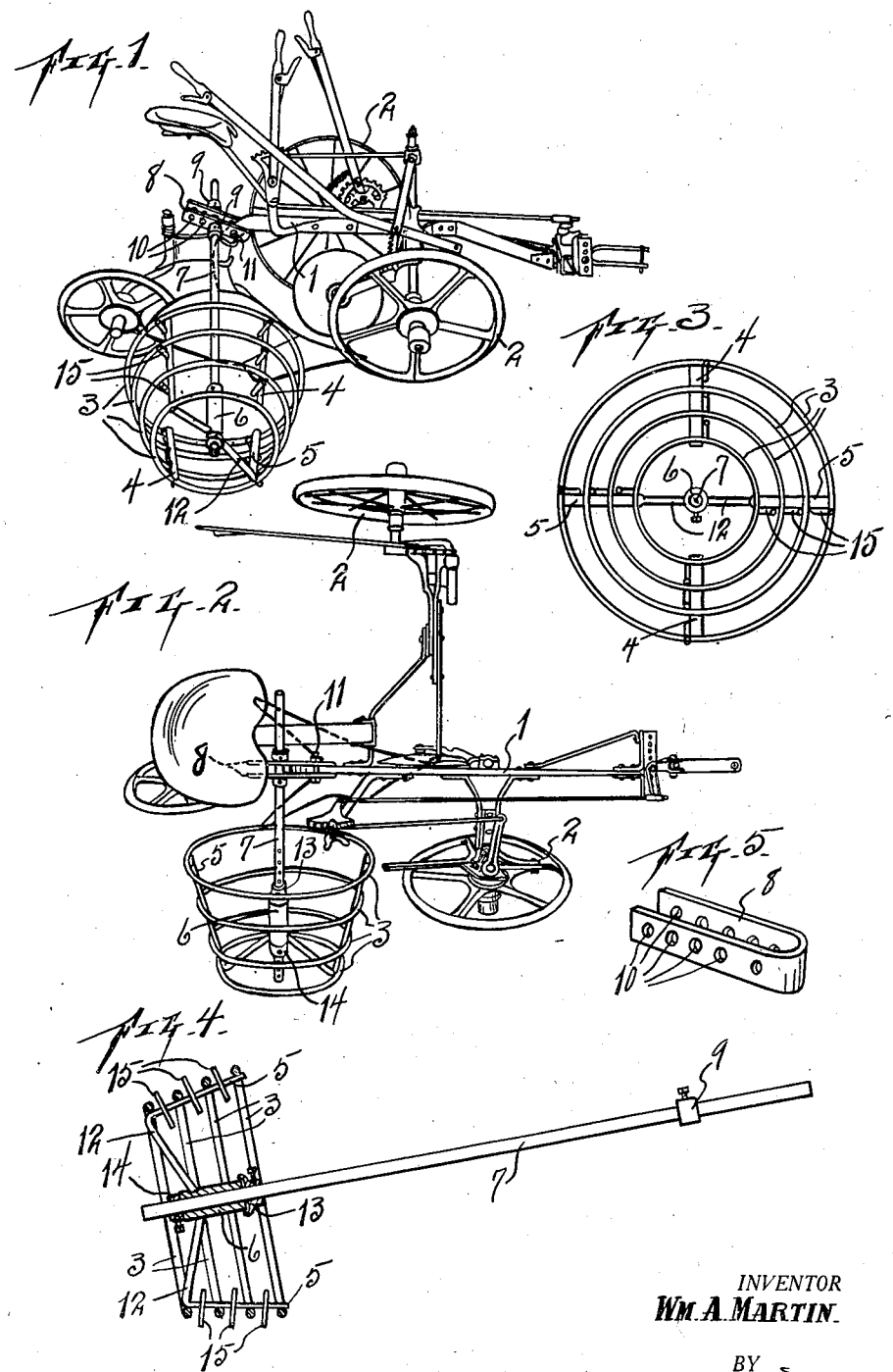
INVENTOR
WM. A. MARTIN.
BY
*John E. [signature]*
ATTORNEY Patented Jan. 29, 1935

1,989,521

UNITED STATES PATENT OFFICE 1,989,521

ATTACHMENT FOR PLOWS AND THE LIKE

William A. Martin, Dallas, Tex., assignor to H. E. Vaughan, Dallas, Tex.

Application June 12, 1933, Serial No. 675,431

4 Claims. (Cl. 97—10)

My invention relates to an attachment for turning plows and the like, and more particularly to a device for cutting or separating grass from the soil as the field is plowed. The object is to provide a mechanism which will pulverize the soil and separate the soil from the roots of grass as the grass is plowed up. Another object is to provide a device for this purpose which is easily attached to the plow and positioned in operative relation thereto without interfering with the natural functions of the plow and its cooperating parts.

An advantage of this invention is that the device is light in structure and inexpensive to make and operate. Another advantage is that the simplicity of structure and lack of moving parts gives the device a long life of usefulness. Other objects and advantages will be fully explained in the following description and the invention will be more particularly pointed out in the claims.

Reference is had to the accompanying drawing which forms a part of this application.

Fig. 1 is a side elevation of a riding turning plow, showing the attachment positioned in operative relation to the plow.

Fig. 2 is a plan view of the same.

Fig. 3 is an end view of the attachment.

Fig. 4 is a vertical section of the same.

Fig. 5 is a detail perspective view of the attaching bracket.

Similar characters of reference are used to indicate the same parts throughout the several views.

The device consists of a plurality of hoops or bands rigidly attached to each other and forming a wheel which is journaled on an elongated axle. The axle is adapted to be connected to the beam 1 of the plow by means of a bracket. The illustrations show the implement attached to a riding plow provided with a single plow but it is apparent that a similar device may be provided for each plow carried by the plow frame 2. The device may be used with any form of plow or plow disk that directs the soil to one side of the furrow. The soil, with any form of plant life that is severed from the ground by the plow, is directed into the wheel and the rotation of the wheel imparts a sifting action to the soil which loosens the soil from the roots of the plant. The use of this device with the plow exposes the roots of grass to the elements which dries it out and makes a more simple method of removing grass from a field.

The hoops or bands 3 which form the wheel are preferably hoops of steel that are made integral with each other by means of bars 4 and 5. The bars 4 and 5 extend in approximately axial alinement with the bands 3 and are made rigid with the inner periphery of each band by welding or any other means of connection. One set of the bars 5 are continued in length and bent to form spokes 12 which are made rigid with a common hub 6. The bands 3 that make the wheel, or the major portion of this device, are each of a different diameter. The largest of the bands 3 is positioned adjacent the plow so that the soil will be thrown from the plow into the bands and on the inner periphery of the band. When the bands or hoops 3 are assembled to form the wheel, first the larger band adjacent the plow, then the next smaller band, and then the next until each is in its relative position, the wheel has a conical contour with the larger end opening toward the moldboard of the plow.

The wheel consisting of the plurality of bands or hoops 3 is provided with an axle 7 which extends from the hub 6 of the wheel up to the beam of the plow. The hoops 3 are rotatably mounted on one end of the axle 7 and the other end of the axle is attached to the beam 1 of the plow by means of a bracket 8. The bracket 8 is U shaped in contour and provided with a plurality of openings 10 in its prongs or outer ends for the axle 7 to pass through. The bracket 8 is made rigid with the beam 1 by means of a bolt 11. In this instance the bracket 8 is attached to the curved portion of the beam 1 and just above the plow. The axle 7 is passed through the openings 10 in the outer ends of the bracket 8 and is held rigid therein by means of collars 9. The collars 9 are each provided with a set screw so that the axle 7 may be held in the openings 10 against any longitudinal movement. The openings 10 are provided in the bracket 8 so that the axle 7 may be connected at various positions relative to the plow. This form of connection for the device holds the axle 7 at right angles to the beam 1 and permits the wheel or hoops 3 to rotate on the ground in the same manner as rotation of the wheels 2 of the frame of the plow. The end of the axle 7 which carries the hub 6 of the hoops 3 is provided with holes so that the hoops 3 may be adjustably mounted on the axle 7. Collars 13 and 14 are held on the axle 7 by means of set screws. The hub 6 is held against longitudinal movement on the axle 7 by placing one of the collars 13 and 14 against each end of the hub 6.

The collar 13 is provided with a yoke which is formed to fit over the end of the hub adjacent the plow so that the dirt will not pass into the bearing portion of the hub 6. The other collar 14 is positioned on the axle 7 at the outer end of the hub 6 and any movement of these collars on the axle, especially any longitudinal movement, will vary the relative position of the wheel or hoops 3 relative to the plow.

The spokes 12 of the hoops 3 are preferably continuations of the hoop connecting members 5 which are bent at approximately right angles to the members 5 and are made rigid with the hub 6. The spokes 12 are bent so as to extend inwardly to the hub 6 from the inner periphery of the smaller of the plurality of hoops 3. This structure places the spokes 12 in the smaller portion of the conical shaped wheel of spokes 3 which leaves an unrestricted opening in the larger end for receiving the soil and weeds from the plow.

Efficient tractor means are provided on the series of hoops 3 which consist of prongs 15 which also serve to agitate the charge received by the wheel from the plow. These prongs 15 are rigidly positioned on the members 4 and 5 so that they radiate from the wheel and extend into the wheel. The central portion of each of the prongs or members 15 are rigidly positioned on the members 4 and 5 at right angles thereto by means of welding or any other method of attaching so that one half of each prong will extend into the wheel and the other half will project outside of the wheel. A prong 15 is placed on the members 4 and 5 between each of the hoops 3. The inner projections of the prongs 15 serve to pick up the clods and grass and carry the grass around a portion of the rotation of the wheel before it is permitted to fall between the hoops 3 and out of the device.

The conical contour of the wheel of hoops 3 causes the axle 7 to be suspended from the beam 1 of the plow frame at an angle to the ground. This position of the wheel causes the hoops 3 to rotate on the ground at a slight angle to the vertical and tends to carry the grass towards the smaller of the hoops 3 before it is discharged from the wheel.

What I claim, is:

1. In an attachment for plows of the class described; a wheel rotatably suspended from the beam of said plow and adapted to rotate on the ground adjacent said plow, and said wheel consisting of a plurality of hoops forming a conical shaped frame having internal bracing and adapted to receive the soil and grass turned from the furrow by said plow.

2. In an attachment for plows of the class described; a conical wheel comprising a plurality of integral hoops carried by the beam of said plow and adapted to rotate on the ground adjacent said plow, and at an angle thereto, said wheel adapted to receive the soil and grass turned from the furrow by said plow, means for varying the distance of said wheel relative to said plow, and means within said wheel for agitating the same.

3. In an attachment for turning plows and the like consisting of a conical wheel rotatably journaled on the beam of said plow, said wheel consisting of a plurality of hoops rigidly attached together and adapted to receive the soil and grass thrown from the furrow by said plow, the axle of said wheel being positioned at right angles to said plow and adapted to slope at a slight angle therefrom, means within said wheel for agitating the soil and removing the soil from the roots of the grass, and traction lugs projected through the outer periphery of said wheel for assisting in the rotation of said wheel on the ground with the movement of said plow.

4. In an attachment for turning plows and the like consisting of a wheel journaled to the beam of said plow and adapted to rotate on the ground adjacent the plow and with the forward movement thereof said wheel consisting of a plurality of graduated hoops made integral with each other and adapted to receive the soil and grass thrown from the furrow by said plow, means within said wheel for separating the soil and grass during its travel therethrough, and means for adjusting said wheel relative to said plow.

WILLIAM A. MARTIN.